US012462957B2

(12) United States Patent
Yamaoka et al.

(10) Patent No.: US 12,462,957 B2
(45) Date of Patent: Nov. 4, 2025

(54) THERMAL PROTECTION DEVICE TO WITHSTAND HIGH VOLTAGE

(71) Applicant: Littelfuse, Inc., Chicago, IL (US)

(72) Inventors: Toshikazu Yamaoka, Tokyo (JP); Yohei Mizukami, Chicago, IL (US); Jianhua Chen, Chicago, IL (US); Werner Johler, Chicago, IL (US)

(73) Assignee: Littelfuse, Inc., Rosemont, IL (US)

( * ) Notice: Subject to any disclaimer, the term of this patent is extended or adjusted under 35 U.S.C. 154(b) by 499 days.

(21) Appl. No.: 18/101,357

(22) Filed: Jan. 25, 2023

(65) Prior Publication Data

US 2023/0245804 A1 Aug. 3, 2023

Related U.S. Application Data

(60) Provisional application No. 63/305,901, filed on Feb. 2, 2022.

(51) Int. Cl.
*H01C 7/02* (2006.01)
*H05B 3/14* (2006.01)

(52) U.S. Cl.
CPC ............... *H01C 7/02* (2013.01); *H05B 3/141* (2013.01); *H05B 2203/02* (2013.01)

(58) Field of Classification Search
CPC ....... H01C 7/02; H05B 3/141; H05B 2203/02
See application file for complete search history.

(56) References Cited

U.S. PATENT DOCUMENTS

| | | | | |
|---|---|---|---|---|
| 10,395,877 | B2 * | 8/2019 | Iwai | H01H 37/761 |
| 2002/0181182 | A1 * | 12/2002 | Hasunuma | H01C 13/02 361/106 |
| 2018/0040443 | A1 * | 2/2018 | Yokota | H02H 3/085 |

FOREIGN PATENT DOCUMENTS

| | | |
|---|---|---|
| JP | 2002233048 A | 8/2002 |
| WO | 2013099678 A1 | 7/2013 |
| WO | 2014109364 A1 | 7/2014 |
| WO | 2015133538 A1 | 9/2015 |

OTHER PUBLICATIONS

Partial European Search Report for the European Application No. EP23154475, mailed Jul. 17, 2023, 12 pages.
European Search Report for EP Application No. 23154475.0, dated Oct. 18, 2023, 12 pages.

* cited by examiner

*Primary Examiner* — Kyung S Lee
(74) *Attorney, Agent, or Firm* — KDW Firm PLLC

(57) ABSTRACT

A thermal protection device, comprising: a first PTC device, arranged in a PTC circuit, and having a first input side, coupled to an input path of the PTC circuit, and having a first output side, coupled to an output path of the PTC circuit; a second PTC device, arranged in the PTC circuit, and having a second input side, coupled to the input path of the PTC circuit, and having a second output side, coupled to the output path of the PTC circuit; and a thermal link having a third input side, coupled to the first output side of the first PTC device and the second output side of the second PTC device, via the output path of the PTC circuit.

13 Claims, 6 Drawing Sheets

Hi-V Thermal Fuse Tested in $850V_{dc}$ and 4A

THERMAL PROTECTION DEVICE TO WITHSTAND HIGH VOLTAGE

CROSS REFERENCE TO RELATED APPLICATION

This application claims the benefit of priority to, U.S. Provisional Patent Application No. 63/305,901, filed Feb. 2, 2022, entitled "Thermal Protection Device to Withstand High Voltage," which application is incorporated herein by reference in its entirety.

BACKGROUND OF THE INVENTION

Field of the Invention

Embodiments relate to the field of resistance heaters, and more particularly to heaters based upon PPTC materials.

Discussion of Related Art

Automobiles and other apparatus may include components that are designed to operate over a wide temperature range. Examples of components that may operate over a wide temperature range include electronic circuits used to control various components in an automobile, as well as batteries used to power automobiles.

In order to protect various electrical and electronic components and circuits, various known devices may be deployed, including thermal protection devices, overvoltage protection devices, as well as overcurrent protection devices.

With respect to this and other considerations the present disclosure is provided.

BRIEF SUMMARY OF THE INVENTION

In one embodiment, a thermal protection circuit may include a first PTC device, arranged in a PTC circuit, and having a first input side, coupled to an input path of the PTC circuit, and having a first output side, coupled to an output path of the PTC circuit; a second PTC device, arranged in the PTC circuit, and having a second input side, coupled to the input path of the PTC circuit, and having a second output side, coupled to the output path of the PTC circuit; and a thermal link having a third input side, coupled to the first output side of the first PTC device and the second output side of the second PTC device, via the output path of the PTC circuit.

In another embodiment, a method of providing thermal protection may include conducting current through a protection circuit, the protection circuit comprising a first PTC device and a second PTC device, arranged in electrically parallel fashion to one another within a PTC circuit, and further comprising a thermal link, arranged in electrical series to the PTC circuit; and responsive to an abnormal condition, changing the first PTC device from a normal state to a tripped state, wherein the second PTC device transitions from a normal conduction state to a tripped state after the tripping the first PTC device, and wherein the second PTC device causes the thermal link to melt.

In a further embodiment, a thermal protection circuit may include a thermal link, arranged along a first current path, the first current path being coupled to an external component; and a PPTC heater, disposed in thermal proximity to the thermal link, the PPTC heater comprising a PPTC device arranged along a second current path, separate from the first current path.

DESCRIPTION OF EMBODIMENTS

Figure 1:
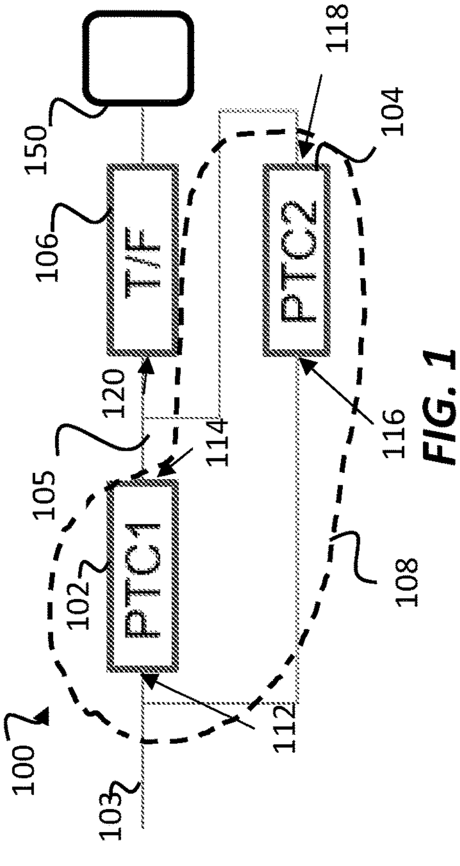
FIG. 1 illustrates a thermal protection circuit, according to embodiments of the disclosure.

The present embodiments will now be described more fully hereinafter with reference to the accompanying drawings, in which exemplary embodiments are shown. The embodiments are not to be construed as limited to the embodiments set forth herein. Rather, these embodiments are provided so that this disclosure will be thorough and complete, and will fully convey their scope to those skilled in the art. In the drawings, like numbers refer to like elements throughout.

In the following description and/or claims, the terms "on," "overlying," "disposed on" and "over" may be used in the following description and claims. "On," "overlying," "disposed on" and "over" may be used to indicate that two or more elements are in direct physical contact with one another. Also, the term "on,", "overlying," "disposed on," and "over", may mean that two or more elements are not in direct contact with one another. For example, "over" may mean that one element is above another element while not contacting one another and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect.

In various embodiments, a novel thermal protection circuit is provided based upon a combination of a PTC circuit and thermal link, or thermal fuse. The thermal protection circuit may be used to protect any suitable object, component, circuit, or combination of the above, according to various non-limiting embodiments. As detailed below, in various embodiments, the PTC circuit may include a first PTC device having a first input side, coupled to an input path of the PTC circuit, and having a first output side, coupled to an output path of the PTC circuit. The PTC circuit may further include a second PTC device, having a second input side, coupled to the input path of the PTC circuit, and having a second output side, coupled to the output path of the PTC circuit. The thermal link of the thermal protection circuit may have a third input side, coupled to the first output side of the first PTC device and the second output side of the second PTC device, via the output path of the PTC circuit. As explained below, this circuit architecture provides advantageous protection in the case of an abnormal event.

Figure 1A:
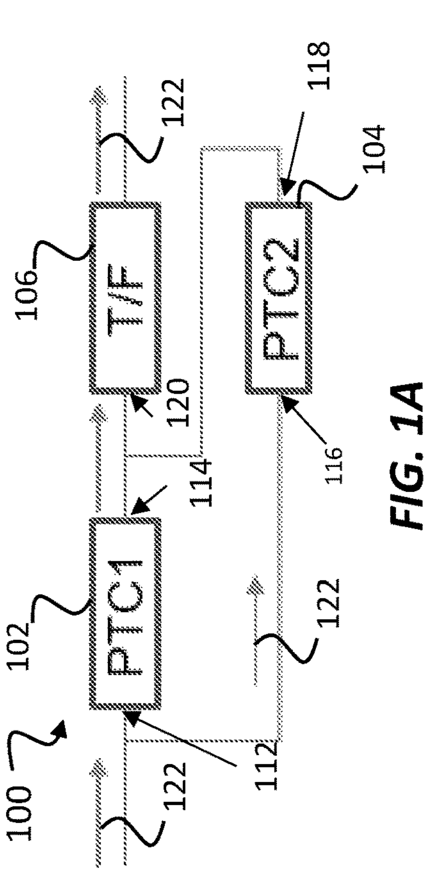
FIG. 1A illustrates operation of the thermal protection circuit of FIG. 1A, during normal conditions.
Figure 1B:
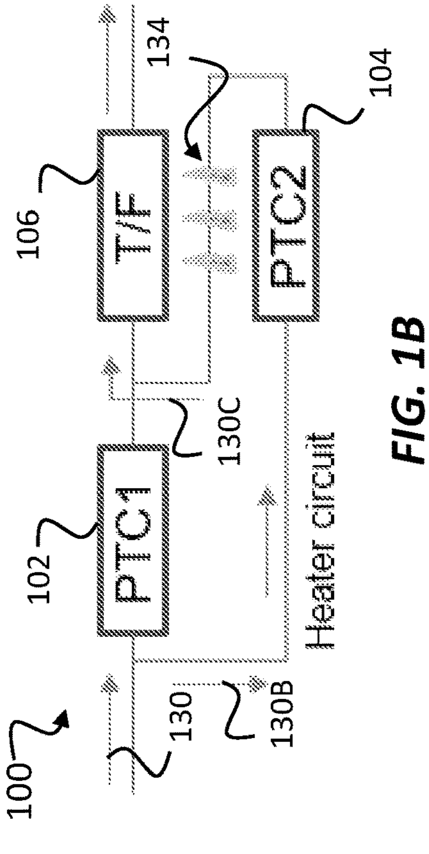
FIG. 1B and FIG. 1C collectively illustrate operation of the thermal protection circuit of FIG. 1A, during an abnormal event.
Figure 1C:
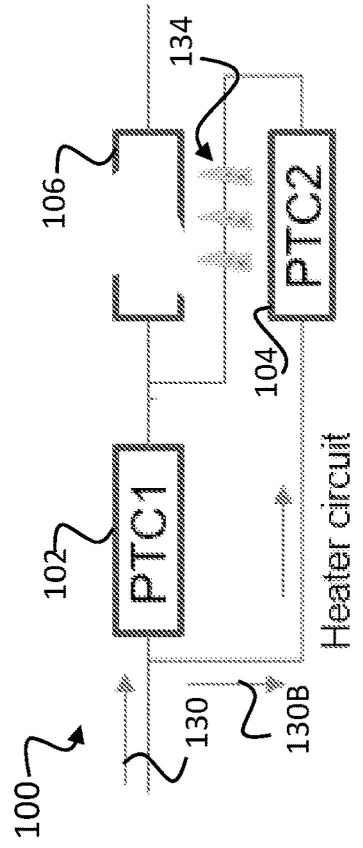

FIG. 1 illustrates a thermal protection circuit 100, according to embodiments of the disclosure. FIG. 1A illustrates operation of the thermal protection circuit 100 of FIG. 1A, during normal conditions. FIG. 1B and FIG. 1C collectively illustrate operation of the thermal protection circuit 100 of FIG. 1A, during an abnormal event. As shown in FIG. 1, the thermal protection circuit 100 includes a first PTC device 102, arranged in a PTC circuit 108, and having a first input side 112, coupled to an input path 103 of the PTC circuit 108, and having a first output side 114, coupled to an output path 105 of the PTC circuit 108. The thermal protection circuit 100 further includes a second PTC device 104, having a second input side 116, coupled to the input path 103 of the PTC circuit 108, and having a second output side 118, coupled to the output path 105 of the PTC circuit 108. The thermal protection circuit also includes a thermal fuse or similar thermal element, referred to herein as a thermal link 106, having a third input side 120, coupled to the first output side 114 of the first PTC device 102 and the second output side 118 of the second PTC device 104, via the output path 105 of the PTC circuit 108.

In accordance with various embodiments of the disclosure, the term PTC device may refer to a device formed of a positive temperature coefficient (PTC) material, where the PTC device is a resettable device that acts to limit current by exhibiting a large increase in resistivity at a given temperature, often referred to as a trip temperature. In specific embodiments, one or more of the first PTC device 102 and the second PTC device 104 may be formed of polymer PTC materials (PPTC) materials. A suitable PTC material or PPTC material may include a polymer matrix, formed of one or more suitable polymers, as well as a conductive filler, such as carbon, metallic powder, graphene, or other known filler materials. Materials properties, such as normal state resistivity may be tailored by adjusting the relative percent of conductive filler with respect to the overall PTC material, including polymer matrix.

Regarding the polymer matrix for a PTC device, suitable materials for PTC device 102 according to non-limiting embodiments include semi-crystalline polymers, e.g., polyethylene, polyvinylidene fluoride, ethylene tetrafluoroethylene, ethylene-vinyl acetate, ethylene and acrylic acid copolymer, ethylene butyl acrylate copolymer, polycaprolactone, polyurethane, and polyester. According to some non-limiting embodiments, suitable materials for second PTC device 104 include semi-crystalline polymers, e.g., polyethylene, polyvinylidene fluoride, perfluoroalkoxy alkane, ethylene tetrafluoroethylene, ethylene-vinyl acetate, ethylene and acrylic acid copolymer, ethylene butyl acrylate copolymer.

As known in the art, the trip temperature of a PTC device may be set by the melting temperature or softening temperature of the polymer matrix of the PTC material. In various embodiments, the first PTC device 102 is arranged with a first trip temperature, and the second PTC device 104 is arranged with a second trip temperature, greater than the first trip temperature. In addition, a first electrical resistivity of the first PTC device 102 may be arranged to be less than a second electrical resistivity of the second PTC device 104. In some non-limiting examples, the electrical resistivity of the first PTC device 102 may be a factor of 10× lower, a factor of 50× lower, or a factor of 100× lower than the electrical resistivity of the second PTC device 104.

In operation, the thermal protection circuit 100 may be coupled to protect any suitable component, shown as component 150, representing a device, circuit, or other entity to be protected. Examples of protection may include limiting current to the component 150 to an acceptable limit for a given operating voltage.

Turning now to FIG. 1A, there is shown the operation of the thermal protection circuit 100 of FIG. 1A, during normal conditions. Under this scenario, electrical current may pass through thermal protection circuit 100 to component 150. The electrical current may be within an acceptable range and may accordingly pass through the thermal protection circuit 100 along a predetermined path. For example, when the resistance of the first PTC device 102 is, for example, 10× or 100× lower than the resistance of the second PTC device 104, most, if not all, of the incident current 122 passing through PTC circuit 108 may be conducted through first PTC device 102 and through thermal link 106, which component may be highly electrically conductive. As such, the thermal link 106 may not be affected by the level of the incident current 122 passing through the thermal protection circuit 100.

FIG. 1B illustrates operation of the thermal protection circuit 100 of FIG. 1A, during an abnormal event. The abnormal event may be such that the first PTC device 102 is tripped. In other words, the abnormal event may cause the temperature of the first PTC device 102 to exceed the trip temperature of the first PTC device 102. One example of an abnormal event is an excess current that causes a PTC device to trip. When a current flows through a PTC device, the heat generated raises the temperature of the PTC device. In the event of excess current, the internal temperature of the first PTC device 102 may reach the trip temperature, where the resistivity of the first PTC device 102 increases by two orders of magnitude, three orders or magnitude, four orders of magnitude, and so forth. As such, current flow may be blocked by the first PTC device 102, where the incident current 130 during the abnormal event is directed as bypass current 130B to the second PTC device 104, which device may initially conduct the excess current therethrough, shown as current 130C.

At the same time the bypass current 130B will cause a temperature increase in the second PTC device 104, and may cause the second PTC device 104 to exceed the trip temperature of the second PTC device 104. The abrupt increase in resistivity of second PTC device 104 in a tripped state will also increase the heat 134 generated by the second PTC device 104 in response to the bypass current 130B passing therethrough.

Turning now to FIG. 1C there is shown a later instance after the instance of FIG. 1B, during the abnormal event, where the heat 134, generated from second PTC device 104, melts the thermal link 106, causing an open circuit condition where current no longer flows through thermal protection circuit 100. By providing the second PTC device 104 in parallel to the first PTC device 102, the branch of the PTC circuit 108 that includes the second PTC device 104 effectively forms a heater circuit, where the second PTC device 104 is triggered to heat the thermal link 106 when first the PTC device 102 is triggered, diverting current to the second PTC device 104.

Note that in various embodiments, the second PTC device 104 may be in thermal proximity to the thermal link 106. In this manner, the thermal link 106 may be caused to open in rapid fashion in response to an abnormal event.

Figure 2:
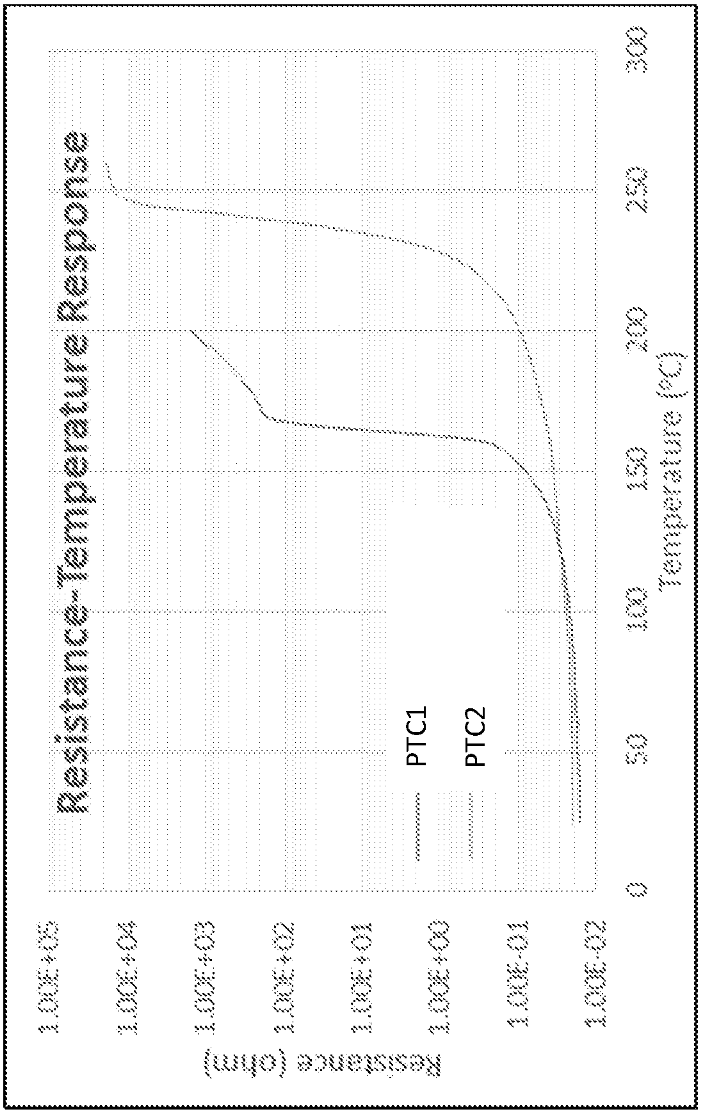
FIG. 2 shows an example of the resistance data as a function of temperature for a first PPTC device and a second PPTC device, according to embodiments of the disclosure.

As noted previously, the trigger temperature of the first PTC device may be lower than the trigger temperature of the second PTC device. FIG. 2 shows exemplary resistance data as a function of temperature for a first PPTC device (PTC1) and a second PPTC device (PTC2), according to embodiments of the disclosure. In this case, the first PPTC device has a trigger temperature in the range of 160 degrees Celsius and the second PPTC device has a trigger temperature in the range of 230 Celsius. Note that in this manner, the first PTC device may serve as a sensor to trigger under overheating, while the second PTC device is used to melt a thermal link, so that the triggering temperature of the first PTC device is to be set lower than the thermal link melting temperature. In this regard, suitable materials for the thermal link according to some non-limiting embodiments include a lead free solder or, alternatively, a lead-containing solder. More generally, the relationship between the various temperatures of the components is trigger (trip) temperature of PTC1<melting temperature of Thermal-link<trip (trip-state) temperature of PTC2. Note that because in embodiments of the disclosure, the PTC2 is triggered by the current, the actual trigger (trip) temperature of the PTC2 is not so important. When the PTC2 is triggered by excess current to enter the trips state, the heat generated during trip state melts the thermal link, so the PTC2 trip temperature (at low current) should be higher than melting point of the thermal link.

Thus, the setting of a relatively wider gap between trip temperatures of PTC1 and PTC2 will afford the ability to use different thermal links, having a wider range of fuse temperatures that fall between the trigger temperatures of PTC1 and PTC2.

Figure 3:
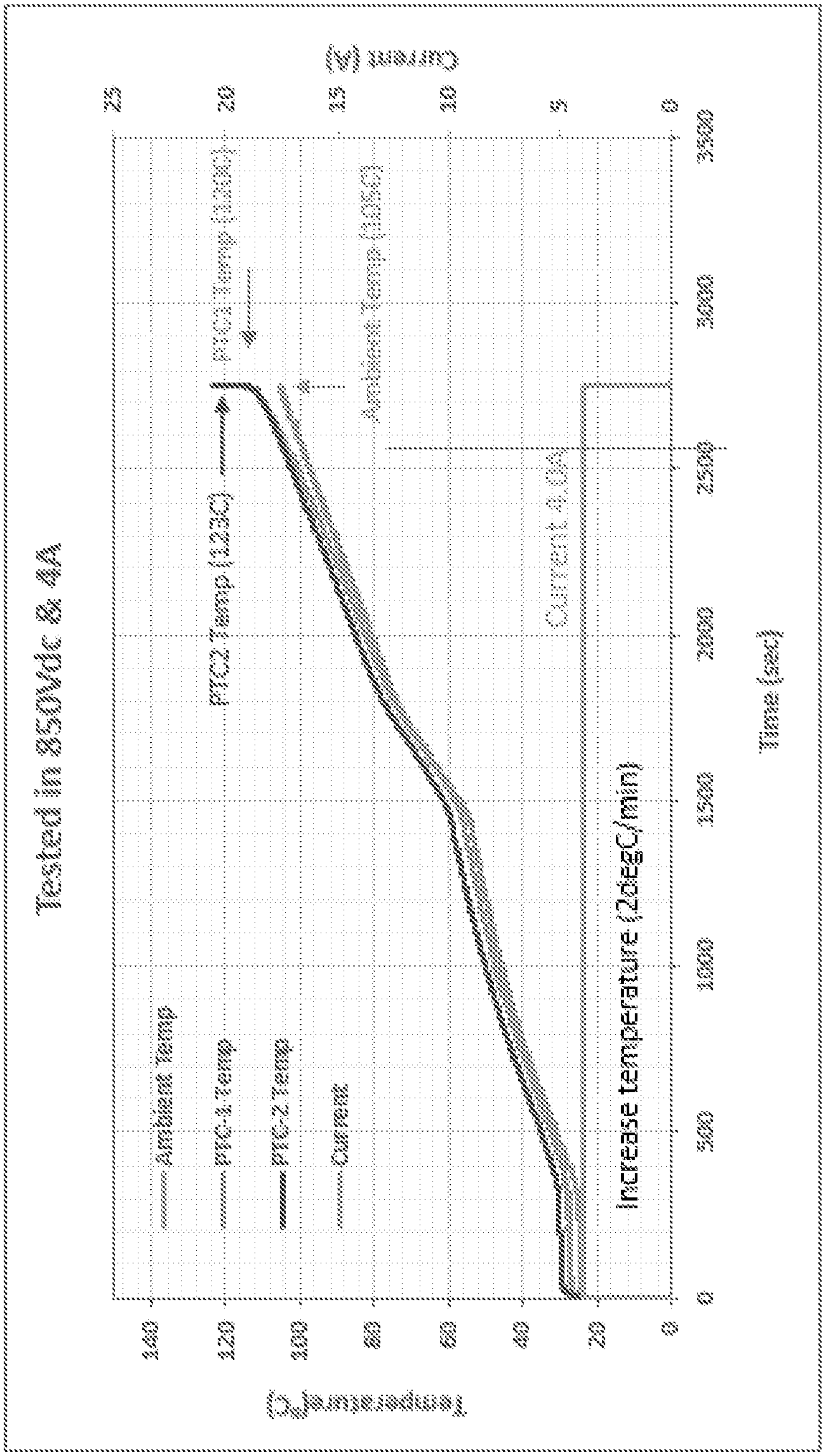
FIG. 3 is a composite graph showing exemplary temperature and current behavior of a PTC circuit, arranged according to embodiments of the disclosure.

FIG. 3 is a composite graph showing exemplary temperature and current behavior of a PTC based thermal protection circuit, arranged according to embodiments of the disclosure. In this example, a circuit similar to the circuit of FIG. 1 is tested at 850 Volts DC and 4 Amps current. The whole circuit is heated from room temperature at a rate of 2 Celsius/min, while current and temperature are monitored. The lowest of the three temperature curves represents the ambient temperature as a function of time, while the other two curves represent the temperature of the first PTC device (PTC1) and the second PTC device (PTC2). At approximately 2750 seconds heating time, the ambient temperature reaches 105 Celsius. At this point, the first PTC device reaches a trigger point, meaning the combination of the 4 Amps current and the ambient temperature causes the first PTC device to reach a trigger point, causing a sharp increase in temperature. At nearly the same time, the second PTC device is also triggered, by virtue of the shunting of the 4 Amps current through the second PTC device, generally as explained above with respect to FIGS. 1B-1C. This causes a sharp increase in temperature to 123 Celsius as shown. This increase in temperature results in opening of a thermal link, which opening results in the current dropping to zero, as shown.

Figure 4:
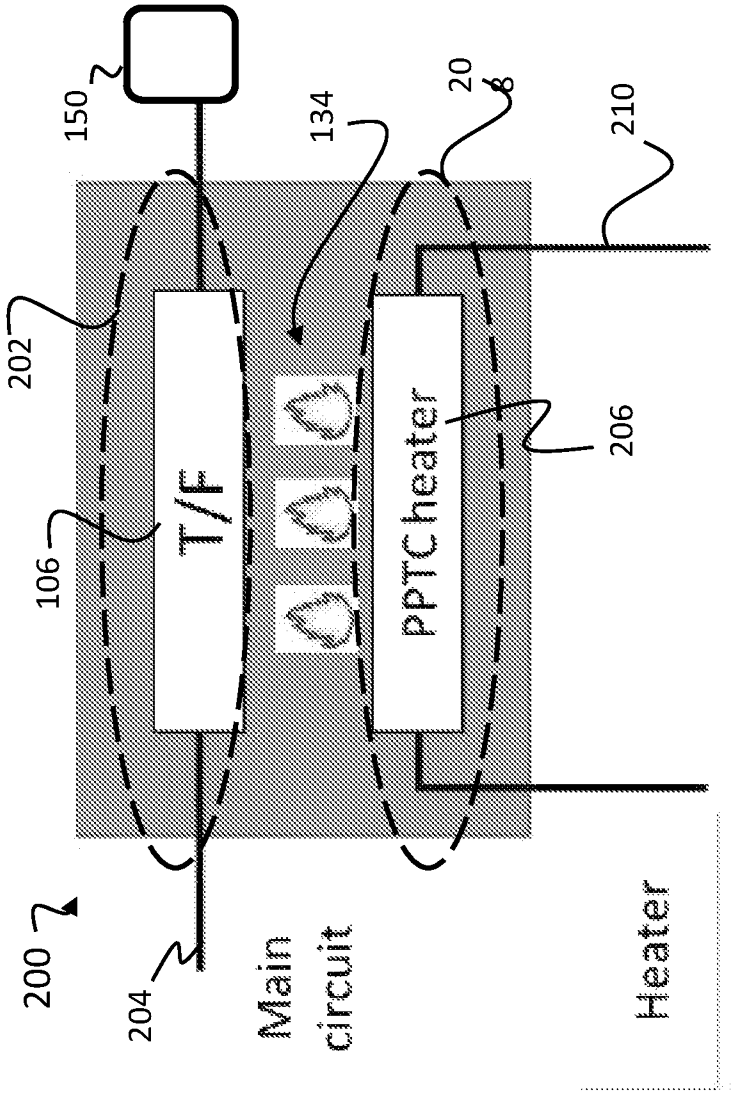
FIG. 4 illustrates a thermal protection circuit, according to embodiments of the disclosure.

FIG. 4 illustrates a thermal protection circuit 200, according to further embodiments of the disclosure. In this example, a thermal link 106 is provided, generally as described above with respect to FIG. 1. For example, the thermal link 106 may form part of a main protection circuit 202 that limits current to the component 150. As shown, the thermal link 106 is arranged in electrical series with the component 150 along the electrical path 204. The thermal protection circuit 200 also includes a PPTC heater 206, arranged in thermal proximity to the thermal link 106. The PPTC heater 206 may be the same as or similar to the second PTC device 104, described above. The PPTC heater 206 is arranged in a heater circuit 208 along an electrical path 210, separate from the electrical path 204. During an abnormal event, when the combination of ambient temperature and current passing through the PPTC material of PPTC heater 206 causes the PPTC heater 206 to exceed the trip temperature of the PPTC heater 206, the PPTC heater 206 may transition to a high resistivity state, and at the same time generate heat 134, as described above. In this manner, the heat 134 may cause to thermal link 106 to open, thus protecting the component 150 from excessive current.

An advantage of the embodiment of FIG. 4 is that because the is triggered by an external (input signal to 210), the timing of when the thermal link 106 is triggered to fuse and create an open circuit is controllable.

Figure 5A:
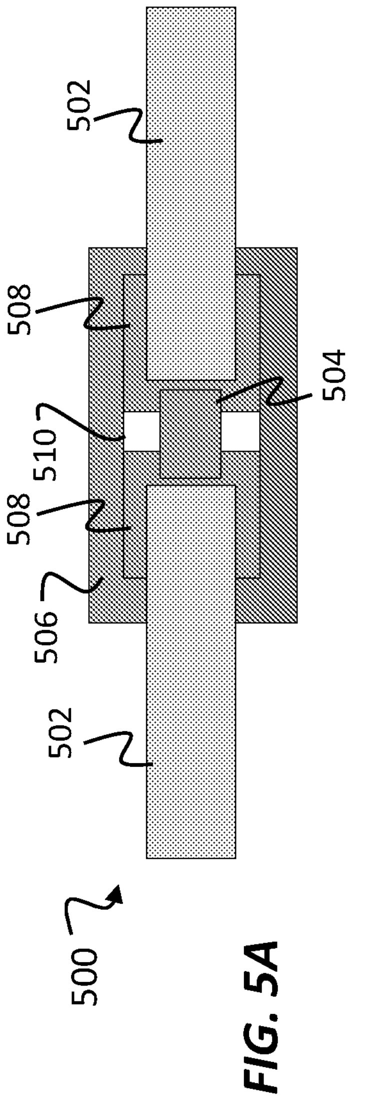
FIG. 5A illustrates a thermal protection circuit in top view, according to embodiments of the disclosure.
Figure 5B:
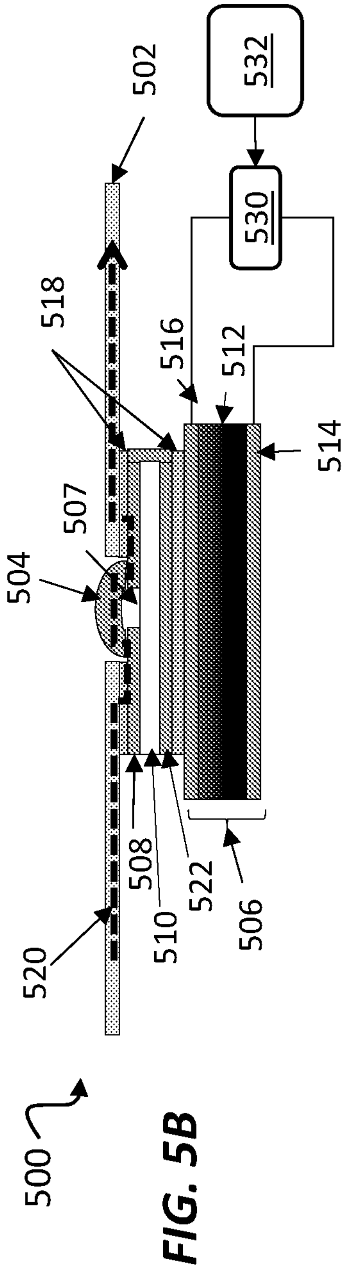
FIG. 5B illustrates the thermal protection circuit of FIG. 5A in cross-section, according to embodiments of the disclosure.

FIG. 5A illustrates a thermal protection circuit in top view, according to embodiments of the disclosure, while FIG. 5B illustrates the thermal protection circuit of FIG. 5A in cross-section, according to embodiments of the disclosure. The thermal protection circuit 500 may be considered a variant of the thermal protection circuit of FIG. 4. A pair of conductors, shown as external conductors 502 are disposed on opposite sides of a thermal link 504, where the thermal link 504 may be an electrically conductive fusable material, as discussed previously. As such, the external conductors 502 and thermal link 504 define a conductive path 520, shown in FIG. 5B. The conductive path 520 may form part of a circuit of a device or other circuitry to be protected. In the thermal protection circuit 500, an electrically insulating substrate 510 is provided subjacent to a pair of electrically conductive pads, shown as conductive pads 508. The conductive pads 508 are in electrical contact with the external conductors 502, and are separated from one another by a gap 507.

The thermal protection circuit 500 further includes a PPTC heater 506 that is formed of a PPTC body 512, disposed between two electrodes, shown as an upper conductive layer 516, and lower conductive layer 514. As in PPTC heater 206, external conductors, such as a lead (not shown), may be coupled to the each of the electrodes of the PPTC heater 506 to drive electrical current through the PPTC heater in an electrical circuit, separate from the electrical circuit formed by conductive path 520.

Note that while the electrically insulating substrate 510 is a poor electrical conductor, for optimal operation, the electrically insulating substrate 510 is a good thermal conductor, so that heat generated by the PPTC heater 506 is efficiently and rapidly transferred to the thermal link 504. Suitable materials for electrically insulating substrate 510 include various known ceramics that exhibit electrical insulation and relatively higher thermal conductivity. In other embodiments, a resin material would be acceptable for the electrically insulating substrate 510 by using a metal layer as thermal conductor.

As illustrated in FIG. 5B, a solder layer 518 is provided between the PPTC heater 506 and the electrically insulating substrate 510. A solder layer 518 may also be provided on the top of conductive pads 508 to connect conductive pads 508 to external conductors 502. In addition, a lower metal layer 522 may be provided on the electrically insulating substrate 510 to bond the electrically insulating substrate 510 to solder layer 518, and thus to PPTC heater 506.

Under normal operation, electrical current may traverse the thermal protection circuit 500, through external conductors 502, thermal link 504 and conductive pads 508, and may be conducted through any external circuitry to be protected. However, under a fault condition, the PPTC heater 506 may be triggered by a controller 532 that directs a triggering current to be sent from a current source 530, so that the triggering current passes through the PPTC body 512. In turn, the triggering current causes the PPTC body to generate heat that is sufficient to fuse the thermal link 504, creating an electrical open between the first one of conductive pads 508 and second one of conductive pads 508, in the region of the gap 507.

Figure 6:
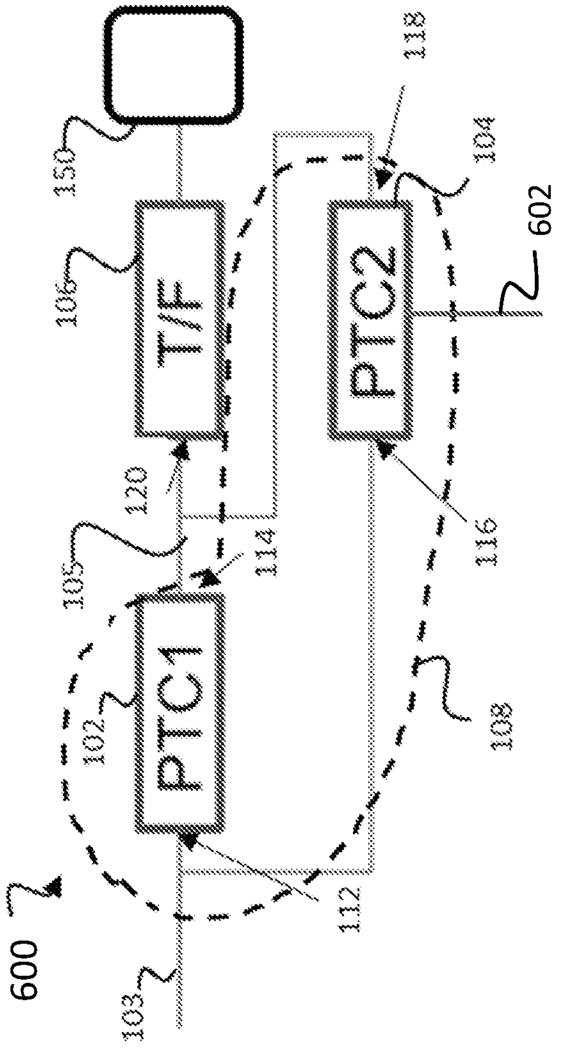
FIG. 6 illustrates another thermal protection circuit, according to further embodiments of the disclosure.

FIG. 6 illustrates another thermal protection circuit, according to further embodiments of the disclosure. The thermal protection circuit 600 is arranged with similar features as the embodiment of FIG. 1, with like elements labeled the same. In the thermal protection circuit 600, an additional terminal is coupled to the second PTC device 104, shown as trigger terminal 602. In this embodiment, in addition to the features of thermal protection circuit 100, discussed above, the trigger terminal 602 may be coupled for remote and external triggering, to trigger the second PTC device to act as a PTC heater in order to heat the thermal link 106. In operation, the PTC2 is triggered by the current input from the trigger terminal 602. In this embodiment, triggering of the PTC heater may be more rapid that in the embodiment of FIG. 4.

While the present embodiments have been disclosed with reference to certain embodiments, numerous modifications, alterations and changes to the described embodiments are possible while not departing from the sphere and scope of the present disclosure, as defined in the appended claims. Accordingly, the present embodiments are not to be limited to the described embodiments, and may have the full scope defined by the language of the following claims, and equivalents thereof.

What is claimed is:

1. A thermal protection circuit, comprising:

a first PTC device, arranged in a PTC circuit, and having a first input side, coupled to an input path of the PTC circuit, and having a first output side, coupled to an output path of the PTC circuit;

a second PTC device, arranged in the PTC circuit, and having a second input side, coupled to the input path of the PTC circuit, and having a second output side, coupled to the output path of the PTC circuit; and a thermal link having a third input side, coupled to the first output side of the first PTC device and the second output side of the second PTC device, via the output path of the PTC circuit;

wherein the first PTC device comprises a first trip temperature PTCT1, wherein the second PTC device comprises a second trip temperature PTCT2, wherein the thermal link comprises a melting temperature TM, wherein PTCT1, <TM.<PTCT2.

2. The thermal protection circuit of claim 1, wherein the first PTC device comprises a first trip temperature, and wherein the second PTC device comprises a second trip temperature, greater than the first trip temperature.

3. The thermal protection circuit of claim 2, wherein the first PTC device comprises polyethylene, polyvinylidene fluoride, ethylene tetrafluoroethylene, ethylene-vinyl acetate, ethylene and acrylic acid copolymer, ethylene butyl acrylate copolymer, polycaprolactone, polyurethane, polyester, or combination thereof.

4. The thermal protection circuit of claim 2, wherein the second PTC device comprises polyethylene, polyvinylidene fluoride, perfluoroalkoxy alkane, ethylene tetrafluoroethylene, ethylene-vinyl acetate, ethylene and acrylic acid copolymer, ethylene butyl acrylate copolymer, or combination thereof.

5. The thermal protection circuit of claim 1, wherein the second PTC device is in thermal proximity with the thermal link.

6. The thermal protection circuit of claim 1, wherein a first electrical resistivity of the first PTC device is less than a second electrical resistivity of the second PTC device.

7. A method of providing thermal protection, comprising:

conducting current through a protection circuit, the protection circuit comprising a first PTC device and a second PTC device, arranged in electrically parallel fashion to one another within a PTC circuit, and further comprising a thermal link, arranged in electrical series to the PTC circuit; and responsive to an abnormal condition, changing the first PTC device from a normal state to a tripped state, wherein the second PTC device transitions from a normal conduction state to a tripped state after the PTC device is changed from the normal state to the tripped state, and wherein the second PTC device causes the thermal link to melt;

wherein the first PTC device comprises a first trip temperature, and wherein the second PTC device comprises a second trip temperature, greater than the first trip temperature.

8. The method of claim 7, wherein:

the first PTC device has a first input side, coupled to an input path of the PTC circuit, and has a first output side, coupled to an output path of the PTC circuit;

the second PTC device, has a second input side, coupled to the input path of the PTC circuit, and has a second output side, coupled to the output path of the PTC circuit; and the thermal link has a third input side, coupled to the first output side of the first PTC device and the second output side of the second PTC device, via the output path of the PTC circuit.

9. The method of claim 8, wherein the second PTC device is in thermal proximity with the thermal link.

10. The method of claim 8, wherein the first PTC device comprises a first trip temperature PTCT1, wherein the second PTC device comprises a second trip temperature PTCT2, wherein the thermal link comprises a melting temperature TM, wherein PTCT1<TM<PTCT2.

11. The method of claim 8, wherein a first electrical resistivity of the first PTC device is less than a second electrical resistivity of the second PTC device.

12. The method of claim 7, wherein the first PTC device comprises polyethylene, polyvinylidene fluoride, ethylene tetrafluoroethylene, ethylene-vinyl acetate, ethylene and acrylic acid copolymer, ethylene butyl acrylate copolymer, polycaprolactone, polyurethane, polyester, or combination thereof.

13. The method of claim 7, wherein the second PTC device comprises polyethylene, polyvinylidene fluoride, perfluoroalkoxy alkane, ethylene tetrafluoroethylene, ethylene-vinyl acetate, ethylene and acrylic acid copolymer, ethylene butyl acrylate copolymer, or combination thereof.

* * * * *